United States Patent
Phelps et al.

(10) Patent No.: US 11,085,399 B2
(45) Date of Patent: *Aug. 10, 2021

(54) GAS TURBINE ENGINE

(71) Applicant: ROLLS-ROYCE plc, London (GB)

(72) Inventors: Benedict R. Phelps, Derby (GB); Mark J. Wilson, Nottingham (GB); Gabriel Gonzalez-Gutierrez, Derby (GB); Nigel H S Smith, Derby (GB); Marco Barale, Derby (GB); Kashmir S. Johal, Derby (GB); Stephane M M Baralon, Derby (GB); Craig W. Bemment, Derby (GB)

(73) Assignee: Rolls-Royce plc

( * ) Notice: Subject to any disclaimer, the term of this patent is extended or adjusted under 35 U.S.C. 154(b) by 108 days.

This patent is subject to a terminal disclaimer.

(21) Appl. No.: 16/106,853

(22) Filed: Aug. 21, 2018

(65) Prior Publication Data

US 2019/0063369 A1 Feb. 28, 2019

(30) Foreign Application Priority Data

Aug. 31, 2017 (GB) ...................... 1713956

(51) Int. Cl.
*F02K 3/06* (2006.01)
*F02C 7/04* (2006.01)
(Continued)

(52) U.S. Cl.
CPC ............... *F02K 3/06* (2013.01); *F01D 5/141* (2013.01); *F02C 3/06* (2013.01); *F02C 7/04* (2013.01);
(Continued)

(58) Field of Classification Search
CPC ... F01D 5/10; F01D 5/16; F01D 5/141; F01D 5/147; F01D 5/148; F05D 2240/31; F05D 2220/36
See application file for complete search history.

(56) References Cited

U.S. PATENT DOCUMENTS

| 7,374,403 B2 * | 5/2008 | Decker | ..................... F02K 3/06 |
| | | | 416/223 R |
| 8,241,003 B2 * | 8/2012 | Roberge | ................ F04D 29/023 |
| | | | 416/229 R |

(Continued)

FOREIGN PATENT DOCUMENTS

| EP | 3361052 A1 | 8/2018 |
| JP | 2014015858 A | 1/2014 |

(Continued)

OTHER PUBLICATIONS

Wendus et al., "Follow-On Technology Requirement Study for Advanced Subsonic Transport", Aug. 2003, NASA/CR-2003-212467 (Year: 2003).*

(Continued)

*Primary Examiner* — Craig Kim
*Assistant Examiner* — Stephanie Sebasco Cheng
(74) *Attorney, Agent, or Firm* — Barnes & Thornburg LLP

(57) ABSTRACT

A gas turbine engine 10 is provided in which a fan having fan blades in which the camber distribution along the span allows the gas turbine engine to operate with improved efficiency when compared with conventional engines, whilst retaining an acceptable flutter margin.

18 Claims, 4 Drawing Sheets

(51) Int. Cl.
*F01D 5/14* (2006.01)
*F02C 3/06* (2006.01)

(52) U.S. Cl.
CPC .. *F05D 2220/323* (2013.01); *F05D 2220/327* (2013.01); *F05D 2220/36* (2013.01); *F05D 2240/301* (2013.01)

(56) References Cited

U.S. PATENT DOCUMENTS

| | | | |
|---|---|---|---|
| 8,579,592 B2* | 11/2013 | Kodama | F04D 29/384 |
| | | | 416/229 R |
| 9,708,914 B2* | 7/2017 | Fulayter | F04D 29/563 |
| 10,184,340 B2* | 1/2019 | Baltas | F01D 5/141 |
| 2008/0025840 A1 | 1/2008 | Guemmer | |
| 2012/0244005 A1 | 9/2012 | Breeze-Stringfellow et al. | |
| 2014/0363276 A1 | 12/2014 | Vetters et al. | |
| 2015/0027101 A1 | 1/2015 | Hasel | |
| 2015/0096303 A1 | 4/2015 | Schwarz et al. | |
| 2016/0363128 A1 | 12/2016 | Gallagher et al. | |
| 2017/0058677 A1 | 3/2017 | Rice | |
| 2017/0167503 A1* | 6/2017 | Gallagher | F01D 5/141 |
| 2020/0080496 A1* | 3/2020 | Lemarchand | F02K 3/06 |

FOREIGN PATENT DOCUMENTS

| | | |
|---|---|---|
| WO | 2012/134833 A2 | 10/2012 |
| WO | 2015/175044 A2 | 11/2015 |
| WO | 2015175044 | 11/2015 |

OTHER PUBLICATIONS

Claire Soares, "Gas Turbines", Oct. 23, 2014, Elsevier, p. 38 (Year: 2014).*

Cengel et al., "Fluid Mechanics", Third Edition, 2014, McGraw Hill, ISBN 978-0-07-338032-2, pp. 660-662 (Year: 2014).*

Kurzke, "Fundamental Differences Between Conventional and Geared Turbofans", Jan. 2009, ResearchGate, DOI: 10.1115/GT2009-59745 (Year: 2009).*

Gerald Knip, "Analysis of an Advanved Technology Subsonic Turbofan Incorporating Revolutionary Materials", May 1987, Lewis Research Center in Cleveland, Ohio, NASA Technical Memorandum 89868 (Year: 1987).*

NASA Glenn Research Center, Specific Thrust, Oct. 19, 2000, NASA, https://www.grc.nasa.gov/WWW/K-12/airplane/specth.html (Year: 2000).*

Dale Rauch, "Design Study of an Air Pump and Integral Lift Engine ALF-504 Using the Lycoming 502 Core", Jul. 1972, NASA Lewis Research Center, CR-120,992 (Year: 1972).*

Philip R. Gliebe et al., Ultra-High Bypass Engine Aeroacoustic Study, Oct. 2003, NASA Glenn Research Center, CR-2003-212525 (Year: 2003).*

Peters, A., et al. "Ultra-Short Nacelles for Low Fan Pressure Ratio Propulsors", Proceedings of Asme Turbo Expo 2014, No. GT2014-26369, Jun. 16-20, 2014.

Extended European Search Report completed on Nov. 16, 2018 and issued in connection with EP Appln. No. 18189080.7, 8 pages.

Extended European Search Report completed on Dec. 4, 2018 and issued in connection with EP Appln. No. 18189079.9. 5 pages.

Extended European Search Report completed on Dec. 18, 2018 and issued in connection with EP Appln. No. 18189081.5, 6 pages.

Great Britain Search Report dated Jan. 23, 2018, issued in GB Patent Application No. 1713954.4.

Great Britain Search Report dated Jan. 23, 2018, issued in GB Patent Application No. 1713956.9.

Great Britain Search Report dated Jan. 23, 2018, issued in GB Patent Application No. 1713955.1.

* cited by examiner

A-A

B-B

GAS TURBINE ENGINE

CROSS-REFERENCE TO RELATED APPLICATIONS

This specification is based upon and claims the benefit of priority from UK Patent Application Number 1713956.9 filed on 31 Aug. 2017, the entire contents of which are incorporated herein by reference.

BACKGROUND

Technical Field

This disclosure relates to a gas turbine engine. Aspects of the disclosure relate to a gas turbine with a fan having an improved pressure ratio distribution.

Description of the Related Art

Modern gas turbine aero-engines typically comprise a fan, which compresses the incoming air and directs at least a portion of that air along a bypass duct, with the remainder of the air flowing through the engine core.

It is desirable to optimize the overall efficiency of the engine, so as to minimize fuel burn (or specific fuel consumption). However, in designing the engine to have optimum efficiency, the present inventors have understood that other aspects of engine performance may be compromised. One such aspect may be fan operability, for example fan blade flutter.

Flutter may be characterized as a self-excited vibration. When the aerofoils in a blade row (such as the fan blades in a gas turbine engine fan) vibrate, they generate unsteady aerodynamic forces on the blade row itself. Under most conditions, these unsteady aerodynamic forces cause the blade row to do work on the surrounding air, and the vibrations decay in amplitude. However, at certain operational conditions (for example certain rotational speeds and/or thrusts and/or combinations thereof), the surrounding air can do work on the fan itself. If the work done by the air exceeds the work (for example by mechanical damping), then the vibrations will grow. This instability is known as flutter. Flutter is undesirable because it can generate large stresses in an engine.

Accordingly, it is desirable to provide an engine with improved overall performance, for example high overall efficiency combined with low susceptibility to flutter.

SUMMARY

According to an aspect, there is provided a gas turbine engine for an aircraft comprising an engine core, the engine core having a turbine, a compressor, and a core shaft connecting the turbine to the compressor. The gas turbine engine comprises a fan located upstream of the engine core, the fan comprising a plurality of fan blades, each fan blade having a radial span extending from a root at a 0% span position to a tip at a 100% span position. The gas turbine engine comprises a gearbox that receives an input from the core shaft and outputs drive to the fan so as to drive the fan at a lower rotational speed than the core shaft. The average (which, as used herein, may be taken as the mean) camber $(\alpha_2-\alpha_1)_{ave}$ of each fan blade taken over the radially innermost 10% of the blade span is as claimed herein.

The root may be the radially innermost gas-washed part of the blade. The tip may be the radially outermost gas-washed part of the blade. In other disclosures, this radially innermost gas-washed part of the blade may be referred to as the hub.

In some arrangements, the average camber $(\alpha_2-\alpha_1)_{ave}$ of each fan blade taken over the radially innermost 10% of the blade span is no greater than 75%, for example no greater than 74%, 73%, 72%, 71%, 70%, 65%, or 60% of the average camber of the 10% blade span portion that has the maximum average camber $(\theta_2-\theta_1)_{max}$. Additionally or alternatively, in some arrangements, the average camber $(\beta_2-\beta_1)_{ave}$ of each fan blade taken over a portion of the blade between the 30% span position and the 40% span position is at least 1.2 times, for example at least 1.3 times, 1.4 times, 1.5 time, or 1.6 times the average camber of the radially innermost 10% of the blade span $(\alpha_2-\alpha_1)_{ave}$.

Accordingly, the fan blades may have an average camber $(\alpha_2-\alpha_1)_{ave}$ of each fan blade taken over the radially innermost 10% in the described and/or claimed ranges as a proportion of the maximum average camber $(\theta_2-\theta_1)_{max}$, and/or the fan blades may have an average camber $(\beta_2-\beta_1)_{ave}$ taken over a portion of the blade between the 30% span position and the 40% span position to be in the described and/or claimed ranges as a proportion of the average camber of the radially innermost 10% of the blade span $(\alpha_2-\alpha_1)_{ave}$.

The camber at a given span position may be defined as the change in angle of a camber line between the leading edge and the trailing edge of an aerofoil cross-section taken through the blade at that span position. Reference to a cross-section through the blade at a given percentage along the blade span (or a given percentage span position) may mean a section through the aerofoil in a plane defined by: a line that passes through the point on the leading edge that is at that percentage of the span along the leading edge from the leading edge root and points in the direction of the tangent to the circumferential direction at that point on the leading edge; and a point on the trailing edge that is at that same percentage along the trailing edge from the trailing edge root.

The present disclosure provides a fan blade having a camber distribution as described and/or claimed herein.

One way to improve the engine efficiency is to reduce the rotational speed of the fan. This may be achieved by providing a gearbox between a turbine and the fan, such that the fan rotates at a lower speed than the turbine from which it is driven.

For a given fan tip loading, the engine efficiency may be improved by reducing the specific thrust (for example at cruise). This may result in improved propulsive efficiency and/or transfer efficiency (which may be a measure of the efficiency of the transfer of energy from the core flow to the bypass flow).

Similarly, for a given specific thrust, the engine efficiency may be improved by increasing the fan tip loading (together with an associated reduction in the rotational speed of the fan). This may result in improved bypass efficiency (which may be a measure of the efficiency of the compression (by the fan) of the bypass flow, and thus may be referred to as the fan tip efficiency).

Thus, the use of a gearbox between the turbine and a fan may be beneficial from an efficiency perspective (for example by facilitating lower specific thrust and/or lower rotational speed and/or higher tip loading), but may present significant operability challenges. For example, such arrangements for improving the engine efficiency may result in fans that are increasingly susceptible to flutter. Purely by way of example, this may be a result of increased working line separation (for example between different flight conditions and/or atmospheric conditions, such as sea level static working line and the cruise working line), flatter fan working lines/characteristics, and/or increased flow diffusion.

Without being bound by any particular theory, the present inventors have understood that the susceptibility of a blade to flutter may depend at least in part on the mode shape (and/or the frequency) of the first vibration mode of the blade (or at least the first vibration mode family of the fan assembly of which the blade is a part). Moreover, again without being bound by any particular theory, the inventors have understood that the engines described and/or claimed herein result in first vibration modes that improve the flutter margin compared to convention arrangements, for example conventional arrangements of camber distributions along the span of a fan blade and/or conventional fan pressure ratios (including fan pressure ratio distributions and/or fan root pressure ratios). The resulting engine may, for example, have improved efficiency compared to conventional arrangements, with an acceptable (for example similar) flutter margin.

The arrangements described and/or claimed herein may result in a lower proportion of the total pressure rise between the fan inlet and the exit to the compressor (i.e. the exit to the highest pressure compressor, immediately upstream of the combustor) being performed by the fan (i.e. by the fan root region as defined in relation to the fan root pressure ratio). This may result in improved overall compression efficiency, for example where the compression efficiency of the fan (more specifically by the fan root region) is lower than the compression efficiency of the higher pressure compressor section(s) (for example a high pressure compressor and an intermediate pressure compressor).

A fan root pressure ratio, defined as the ratio of the mean total pressure of the flow at the fan exit that subsequently flows through the engine core to the mean total pressure of the flow at the fan inlet, may be no greater than (for example less than) 1.25 at cruise conditions.

The flow at the fan exit that subsequently flows through the engine core may be defined by a streamtube that extends from the fan exit to the engine core. Such a streamtube may be bounded by a radially outer surface that terminates at the splitter, i.e. by a radially outer surface that is formed by streamlines that terminate at a stagnation point on the splitter. Such a streamtube may be generally annular. For example a cross-section through such a streamtube may be substantially annular at any given cross-section perpendicular to the engine (rotational) axis.

The fan exit may be defined as the surface swept by the trailing edges of the fan blades. The fan exit flow may be the flow that is immediately downstream of the fan, for example immediately downstream of the fan blade trailing edges. It may be possible to achieve a sufficiently accurate measurement of the fan exit total pressure by measuring the total pressure at the leading edge of a stator vane (either in the core engine or the bypass duct, depending on the measurement required) that is immediately downstream (for example, having no intermediate rotors) of the trailing edge of the fan blade.

The flow at the fan exit that subsequently flows through the engine core may mean all of the flow at the fan exit that subsequently flows through the engine core.

The mean total pressure of the flow at the fan exit that subsequently flows through the engine core may be the mean total pressure over the surface formed by the intersection of the streamtube that extends from the fan exit to the engine core and the surface swept by the trailing edges of the fan blades. Alternatively, for example, the mean total pressure of the flow at the fan exit that subsequently flows through the engine core may be defined as the mean total pressure over the surface formed by the intersection of the streamtube that extends from the fan exit to the engine core and a surface that is perpendicular to the engine (rotational) axis and passes through the splitter. The total pressure loss between the fan exit and the splitter may be negligible. The total pressure for a given streamline may be substantially the same at the fan exit and the core entrance.

The fan inlet may be defined as the surface swept by the leading edges of the fan blades. The mean total pressure of the flow at the fan inlet may be the mean total pressure over that surface, for example an average taken over the area of that swept surface. The mean total pressure of the flow at the fan inlet may be the mean total pressure of the flow just upstream of the fan (or fan blades). Typically, the mean total pressure of the flow at the fan inlet includes ram effects of the engine inlet.

Where the term mean is used herein in relation to a pressure (for example a total pressure), this may be (for example) an area average taken over the relevant surface.

The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The bypass duct may be substantially annular. The bypass duct may be radially outside the core engine. The radially outer surface of the bypass duct may be defined by a nacelle and/or a fan case.

Where reference is made to the axial, radial and circumferential directions, the skilled person will readily understand this to mean the conventional directions when the fan blade is assembled as part of a fan stage or is provided in a gas turbine engine. For example, viewing the blade along a circumferential direction may mean viewing the blade in side profile and/or in the meridional plane and/or projected onto a plane defined by the axial and radial directions.

Cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mn 0.7 to 0.9, for example 0.75 to 0.85, for example 0.76 to 0.84, for example 0.77 to 0.83, for example 0.78 to 0.82, for example 0.79 to 0.81, for example on the order of Mn 0.8. Any single speed within these ranges may be the cruise condition. For some aircraft, the cruise conditions may be outside these ranges, for example below Mn 0.7 or above Mn 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m, for example in the range of from 10500 m to 11500 m or 11600 m, for example in the range of from 10600 m to 11400 m (for example around 10668 m, which corresponds to 35000 ft in imperial units), for example in the range of from 10700 m to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

In some arrangements, the fan root pressure ratio at cruise conditions may be no greater than 1.24, for example no greater than 1.23, for example no greater than 1.22, for example no greater than 1.21, for example no greater than 1.2, for example no greater than 1.19, for example no greater than 1.18, for example no greater than 1.17, for example no greater than 1.16, for example no greater than 1.15.

A fan tip pressure ratio may be defined as the ratio of the mean total pressure of the flow at the fan exit that subsequently flows through the bypass duct to the mean total pressure of the flow at the fan inlet.

The ratio between the fan root pressure ratio to the fan tip pressure ratio at cruise conditions may be less than 1, for example less than 0.95, for example less than 0.92 for example less than 0.9, for example less than 0.89, for example less than 0.88, for example less than 0.87, for example less than 0.86, for example less than 0.85, for example less than 0.84, for example less than 0.83, for example less than 0.82, for example less than 0.81, for example less than 0.8.

The flow at the fan exit that subsequently flows through the bypass duct may mean all of the flow at the fan exit that subsequently flows through the bypass duct. The flow that subsequently flows through the bypass duct may be defined as all of that flow that does not subsequently flow through the engine core.

The flow at the fan exit that subsequently flows through the bypass duct may be defined by a streamtube that extends from the fan exit to the exit of the bypass duct. Such a streamtube may be bounded by a radially inner surface that terminates at the splitter, i.e. by a radially inner surface that is formed by streamlines that terminate at a stagnation point on the splitter. Such a streamtube may be generally annular. For example a cross-section through such a streamtube may be substantially annular at any given cross-section perpendicular to the engine (rotational) axis.

The mean total pressure of the flow at the fan exit that subsequently flows through the bypass duct may be the mean total pressure over the surface formed by the intersection of the streamtube that extends from the fan exit to the exit of the bypass duct and the surface swept by the trailing edges of the fan blades. Alternatively, for example, the mean total pressure of the flow at the fan exit that subsequently flows through the bypass duct may be defined as the mean total pressure over the surface formed by the intersection of the streamtube that extends from the fan exit to the exit of the bypass duct and a surface that is perpendicular to the engine (rotational) axis and passes through the splitter. Alternatively still, for example, the mean total pressure of the flow at the fan exit that subsequently flows through the bypass duct may be defined as the mean total pressure over the surface formed by the intersection of the streamtube that extends from the fan exit to the exit of the bypass duct and a surface that is perpendicular to the engine (rotational) axis and passes through the leading edge of a stator vane in the bypass duct, which may typically be referred to as an outlet guide vane (or OGV). The total pressure loss between the fan exit and the splitter (or OGV) may be negligible. The total pressure for a given streamline may be substantially the same at the fan exit and the entrance and/or exit of the bypass duct.

A fan tip loading may be defined as $dH/U_{tip}^2$, where dH is the enthalpy rise (for example the 1-D average enthalpy rise) across the fan and $U_{tip}$ is the velocity of the fan tip, for example at the leading edge of the tip (which may be defined as fan tip radius at leading edge multiplied by rotational speed). The fan tip loading at cruise conditions may be greater than (or on the order of) 0.3, for example greater than (or on the order of) 0.31, for example greater than (or on the order of) 0.32, for example greater than (or on the order of) 0.33, for example greater than (or on the order of) 0.34, for example greater than (or on the order of) 0.35, for example greater than (or on the order of) 0.36, for example in the range of from 0.3 to 0.4 (all units in this paragraph being $JKg^{-1}K^{-1}/(ms^{-1})^2$).

Fan tip loading in the ranges described and/or claimed herein (which may in general be higher than some conventional arrangements) may be beneficial to overall engine performance. The engine arrangements (for example the camber distributions defined and/or claimed herein) described and/or claimed herein may enable such fan tip loading whilst maintaining acceptable (or sufficient) flutter margin.

The gas turbine engines described and/or claimed herein may or may not be provided with a variable area nozzle (VAN). Such a variable area nozzle may allow the exit area of the bypass duct to be varied in use. In general, gas turbine engines with VANs may have higher tip loadings than those without VANs, but the general principles of the present disclosure may apply to engines with or without a VAN.

Gas turbine engines in accordance with the present disclosure may have any desired bypass ratio, where the bypass ratio is defined as the ratio of the mass flow rate of the bypass flow to the mass flow rate of the core flow at cruise conditions. In some arrangements the bypass ratio may be greater than 10, for example greater than 11, for example greater than 11.5, for example greater than 12, for example greater than 13, for example greater than 14, for example greater than 15.

Specific thrust of an engine may be defined as the net thrust of the engine divided by the total mass flow through the engine. At cruise conditions, the specific thrust of an engine described and/or claimed herein may be less than 110 $NKg^{-1}s$ for example less than 105 $NKg^{-1}s$, for example less than 100 $NKg^{-1}s$, for example less than 95 $NKg^{-1}s$, for example less than 90 $NKg^{-1}s$. Such engines may be particularly efficient in comparison with conventional gas turbine engines.

The ratio of the radius of the fan blade at the root to the radius of the fan blade at the tip may be less than 0.35, for example less than 0.34. for example less than 0.33, for example less than 0.32, for example less than 0.31, for example less than 0.3, for example less than 0.29, for example less than 0.28, for example less than 0.27. These ratios may commonly be referred to as the hub to tip ratio. The radius at the root and the radius at the tip may both be measured at the leading edge (or axially forwardmost) part of the blade.

The radius of the fan may be measured between the engine centreline and the tip of a fan blade at its leading edge. The fan diameter (which may simply be twice the radius of the fan) may be greater than 250 cm, for example greater than 260 cm, 270 cm, 280 cm, 290 cm, 300 cm, 310 cm, 320 cm, 330 cm, 340 cm or 350 cm.

The gas turbine engine as described and/or claimed herein may have any suitable general architecture. For example, the gas turbine engine may have any desired number of shafts that connect turbines and compressors, for example one, two or three shafts. Purely by way of example, the turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream (for example at the exit of) the exit to the second compressor, where a second compressor is provided. By way of further example, the flow at the exit to the combustor may be provided to the inlet of the second turbine, where a second turbine is provided. The combustor may be provided upstream of the turbine(s). An overall pressure ratio may be defined as the ratio of the mean total pressure of the flow at the inlet to the combustor to the mean total pressure of the flow at the fan inlet. The ratio of the fan root pressure ratio to the overall pressure ratio may be less than 0.040, for example less than 0.039, for example less than 0.038, for example less than 0.037, for example less than 0.036, for example less than 0.035, for example less than 0.034, for example less than 0.033, for example less than 0.032, for example less than 0.031, for example less than 0.030, for example less than 0.029, for example less than 0.028, for example less than 0.027, for example less than 0.0265, for example less than 0.025.

The ratio of the fan root pressure ratio to the overall pressure ratio may be in the range of from 0.01 to 0.04, for example 0.015 to 0.035, for example 0.02 to 0.03, for example 0.022 to 0.027.

Thus, according to an aspect (which may be independent of any other aspect), there is provided a gas turbine engine for an aircraft comprising: an engine core comprising a turbine, a compressor, and a core shaft connecting the turbine to the compressor; a fan located upstream of the engine core; a gearbox that receives an input from the core shaft and outputs drive to the fan so as to drive the fan at a lower rotational speed than the core shaft; and an annular splitter at which the flow is divided between a core flow that flows through the engine core, and a bypass flow that flows along a bypass duct. In this aspect, a ratio of the fan root pressure ratio to the overall pressure ratio is in any of the ranges set out herein, for example in the range of from 0.01 to 0.04, for example 0.015 to 0.035, for example 0.02 to 0.03, for example 0.022 to 0.027.

The or each compressor (for example the first compressor and second compressor as described above) may comprise any number of stages, for example multiple stages. Each stage may comprise a row of rotor blades and a row of stator vanes. The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Any fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre, and/or from a metal, such as a titanium based metal or an aluminium based material (such as an Aluminium-Lithium alloy) or a steel based material.

A fan as described and/or claimed herein may comprise a hub, from which the fan blades may extend, for example in a radial direction. The fan blades may be attached to the hub in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a hub. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The skilled person will appreciate that except where mutually exclusive, a feature described in relation to any one of the above aspects may be applied to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
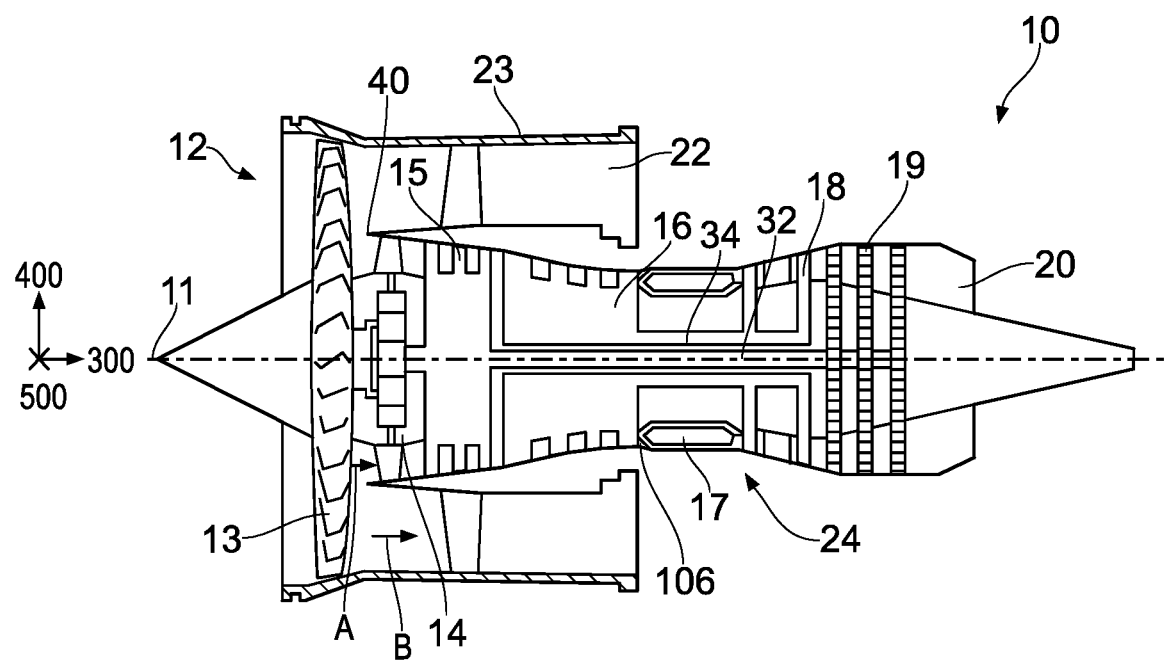
FIG. 1 is a sectional side view of a gas turbine engine in accordance with the present disclosure.

With reference to FIG. 1, a gas turbine engine is generally indicated at 10, having a principal and rotational axis 11. The engine 10 comprises, in axial flow series, an air intake 12, a propulsive fan 13, a gearbox 14, an intermediate pressure compressor 15, a high-pressure compressor 16, combustion equipment 17, a high-pressure turbine 18, a low-pressure turbine 19 and an exhaust nozzle 20. A nacelle 21 generally surrounds the engine 10 (see FIG. 2) and defines the intake 12. The nacelle 21 may be, or may comprise, a fan containment case 23. The nacelle 21 and the fan case 23 may be separate components.

The gas turbine engine 10 works in the conventional manner so that air entering the intake 12 is accelerated and compressed by the fan 13 to produce two air flows: a first air flow A into the engine core (indicated generally by reference numeral 24) and a second air flow B which passes through a bypass duct 22 to provide propulsive thrust. The first and second airflows A, B split at a generally annular splitter 40, for example at the leading edge of the generally annular splitter 40 at a generally circular stagnation line. The engine core 24 includes an intermediate pressure compressor 15 (which may be referred to herein as a first compressor 15) which compresses the air flow directed into it before delivering that air to the high pressure compressor 16 (which may be referred to herein as a second compressor 16) where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 (which may be referred to as a second turbine 18) and the low pressure turbine 19 (which may be referred to as a first turbine 19) before being exhausted through the nozzle 20 to provide additional propulsive thrust. The intermediate pressure compressor 15 is driven by the low pressure turbine 19 by a first (or low pressure) shaft 32. The high pressure compressor 16 is driven by the low pressure turbine 18 by a second (or high pressure) shaft 34. The first shaft 32 also drives the fan 13 via the gearbox 14. The gearbox 14 is a reduction gearbox in that it gears down the rate of rotation of the fan 13 by comparison with the intermediate pressure compressor 15 and low pressure turbine 19. The gearbox 14 may be any suitable type of gearbox, such as an epicyclic planetary gearbox (having a static ring gear, rotating and orbiting planet gears supported by a planet carrier and a rotating sun gear) or a star gearbox. Additionally or alternatively the gearbox may drive additional and/or alternative components (e.g. the intermediate pressure compressor and/or a booster compressor).

The first and second compressors 15, 16, first and second turbines 19, 18, first and second shafts 32, 34, and the combustor 17 may all be said to be part of the engine core 24.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 24 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction 300 (which is aligned with the rotational axis 11), a radial direction 400, and a circumferential direction 500 (shown perpendicular to the page in the FIG. 1 view). The axial, radial and circumferential directions 300, 400, 500 are mutually perpendicular.

Figure 2:
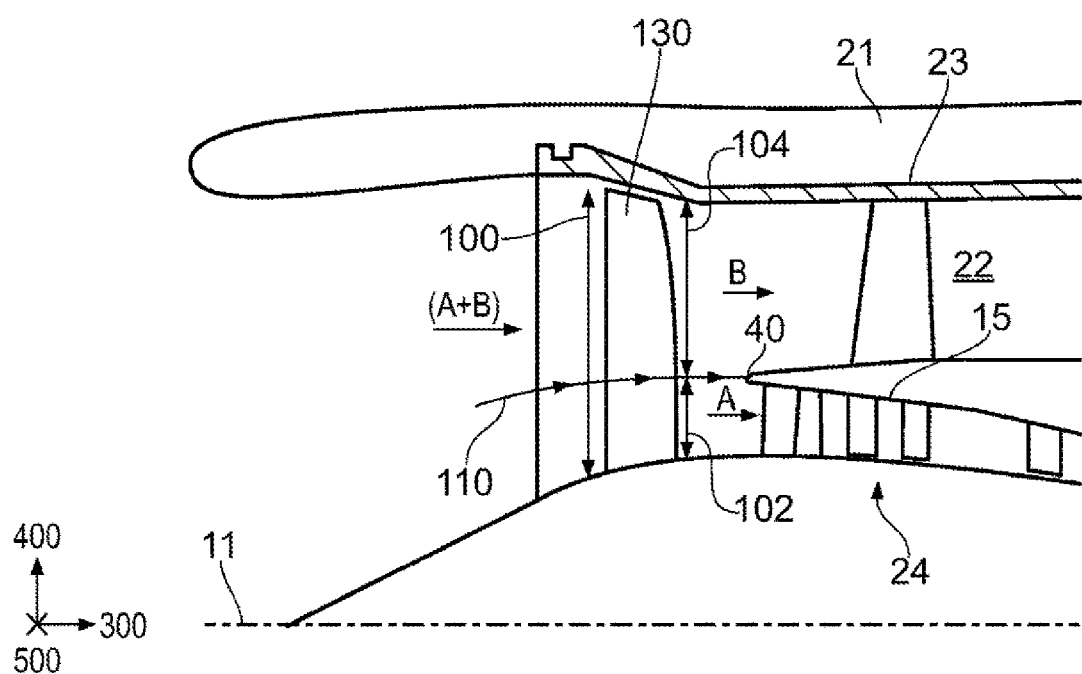
FIG. 2 is a close-up side view of an inlet region of a gas turbine engine in accordance with the present disclosure.

FIG. 2 shows a close-up side (axial-radial) view of the intake region of the gas turbine engine 10. At cruise conditions (as defined elsewhere herein), the total mass flow into the engine is (A+B). The mass flow into the engine core 24 is A, and the mass flow into the bypass duct is B. A stagnation streamline 110 stagnates on the leading edge of the splitter 40. The stagnation streamlines 110 around the circumference of the engine 10 form a streamsurface 110. All of the flow A radially inside this streamsurface 110 ultimately flows through the engine core 24. The streamsurface 110 forms a radially outer boundary of a streamtube that contains all of the flow that ultimately flows through the engine core 24, which may be referred to as the core flow A. All of the flow B radially outside the streamsurface 110 ultimately flows through the bypass duct 22. The streamsurface 110 forms a radially inner boundary of a streamtube that contains all of the flow B that ultimately flows through the bypass duct 22, which may be referred to as the bypass flow B.

The ratio of the mass flow rate of the bypass flow B to the core flow A may be as described and/or claimed herein, for example at least 13.

In use, the fan blades 130 of the fan 13 do work on the flow, thereby raising the total pressure of the flow. As shown in FIGS. 1 and 2, the fan blades 130 may, of course, be described as being the most upstream of all of the blades in the engine 10. In other words, there may be no blades upstream of the fan blades 130. A fan root pressure ratio is defined as the mean total pressure of the flow at the fan exit that subsequently flows (as flow A) through the engine core 24 to the mean total pressure at the inlet to the fan 13. With reference to FIG. 2, the mean total pressure of the flow at the fan exit that subsequently flows through the engine core is the mean total pressure over the surface 102 that is just downstream of the fan 13 and radially inside the streamsurface 110, and may be designated as $P_{102}$. Also in FIG. 2, the mean total pressure at the inlet to the fan 13 is the mean total pressure over the surface 100 that extends across the engine and is immediately upstream of the fan 13, and may be designated as $P_{100}$.

The value of the fan root pressure ratio ($P_{102}/P_{100}$) may be as described and/or claimed herein, for example less than 1.25, and/or less than 1.22.

A fan tip pressure ratio is defined as the mean total pressure of the flow at the fan exit that subsequently flows (as flow B) through the bypass duct 22 to the mean total pressure at the inlet to the fan 13. With reference to FIG. 2, the mean total pressure of the flow at the fan exit that subsequently flows through the bypass duct 22 is the mean total pressure over the surface 104 that is just downstream of the fan 13 and radially outside the streamsurface 110, and may be designated as $P_{104}$.

The ratio between the fan root pressure ratio ($P_{102}/P_{100}$) and the fan tip pressure ratio ($P_{104}/P_{100}$) may be as described and/or claimed herein, for example less than 0.95, and/or less than 0.9 and/or less than 0.85. This ratio may alternatively be expressed simply as the ratio between the mean total pressure ($P_{102}$) of the flow at the fan exit that subsequently flows (as flow A) through the engine core 24 to the mean total pressure ($P_{104}$) of the flow at the fan exit that subsequently flows (as flow B) through the bypass duct 22.

Referring back to FIG. 1, the exit from the high pressure (or second) compressor 16 is indicated by reference numeral 106. This may additionally or alternatively referred to as the location 106 at the inlet to (or immediately upstream of) the combustor 17. Accordingly, the core flow at the location 106 may have been compressed by all compression stages 15, 16 in the engine 10.

An overall pressure ratio ($P_{106}/P_{100}$) may be defined as the mean total pressure immediately upstream of the combustor 17 ($P_{106}$) divided by the mean total pressure at the fan inlet ($P_{100}$). The ratio of the fan root pressure ratio to the overall pressure ratio (which may be referred to as the ratio of the mean total pressure ($P_{102}$) of the flow at the fan exit that subsequently flows through the engine core 24 divided by the mean total pressure immediately upstream of the combustor 17 ($P_{106}$)) may be in the ranges described and/or claimed elsewhere herein, for example less than 0.04.

Figure 3:
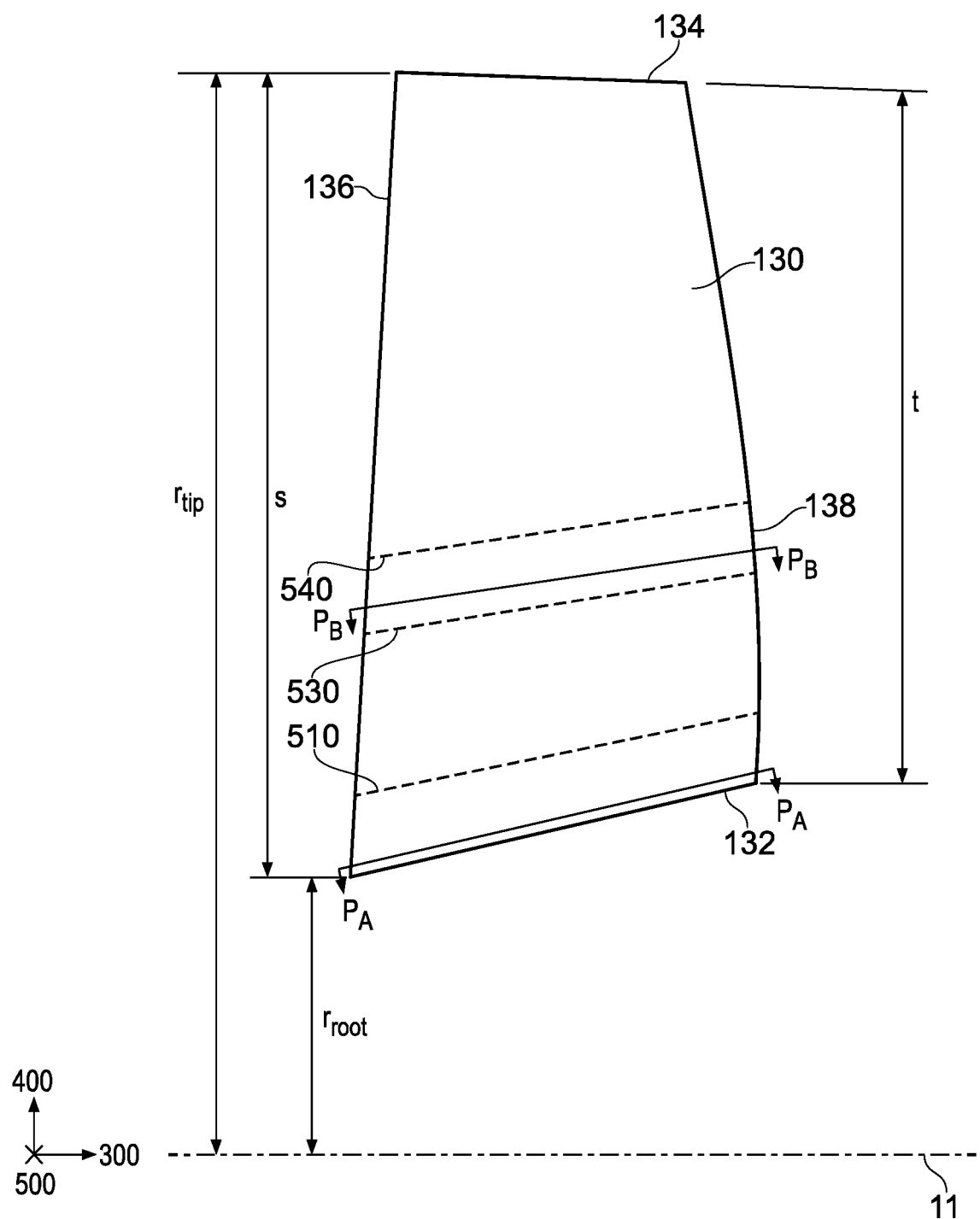
FIG. 3 is another side view of a fan blade for use with examples of the present disclosure.

FIG. 3 shows the fan blade 130 in greater detail. The fan blade 130 extends from a root 132 to a tip 134 in a substantially radial spanwise direction 400. The root 132 may be defined by the radially innermost gas-washed points of the blade 130 and/or may be defined as an intersection between the fan blade 130 and a surface (for example a conical and/or cylindrical surface) from which the fan blades 13 extend. The fan blade 130 has a leading edge 136 and a trailing edge 138. The leading edge 136 may be defined as the line defined by the axially forwardmost points of the fan blade 130 from its root 132 to its tip 134. The fan blade 130 may (or may not) have a fixture portion (not shown) radially inboard of the root, which may be used to fix the fan blade 130 to the rest of the engine.

The radius of the leading edge 136 of the fan blade 130 at its root 132 is designated in FIG. 3 as $r_{root}$. The radius of the leading edge 136 of the fan blade 130 at its tip 134 is designated in FIG. 3 as $r_{tip}$. The ratio of the radius of the leading edge 136 of the fan blade 130 at its root 132 to the radius of the leading edge 136 of the fan blade 130 at its tip 134 ($r_{root}/r_{tip}$) may be as described and/or claimed herein, for example less than 0.35 and/or less than 0.33 and/or less than 0.28.

The span s of the blade 130 is defined as the difference in the radius of the leading edge 136 at the tip and the radius of the leading edge 136 at the root ($r_{tip}-r_{root}$).

In use of the gas turbine engine 10, the fan 13 (with associated fan blades 130) rotates about the rotational axis 11. This rotation results in the tip 134 of the fan blade 130 moving with a velocity $U_{tip}$. The work done by the fan blades 13 on the flow results in an enthalpy rise dH of the flow. Accordingly, a fan tip loading may be defined as $dH/U_{tip}^2$, where dH is the enthalpy rise (for example the 1-D average enthalpy rise) across the fan and $U_{tip}$ is the velocity of the fan tip (which may be defined as fan tip radius at leading edge multiplied by rotational speed). As noted elsewhere herein, the fan tip loading at cruise conditions may be greater than (or on the order of) 0.3, for example greater than (or on the order of) 0.31, for example greater than (or on the order of) 0.32, for example greater than (or on the order of) 0.33, for example greater than (or on the order of) 0.34, for example greater than (or on the order of) 0.35, for example greater than (or on the order of) 0.36, for example in the range of from 0.3 to 0.4 (all figures having units $JKg^{-1}K^{-1}/(ms^{-1})^2$).

The specific thrust of the gas turbine engine 10 may be in the ranges described and/or claimed herein.

A cross-sectional plane P through the blade 130 may be defined by an extrusion in the circumferential direction of a straight line formed between a point on the leading edge 136 that is at a given percentage X of the span s from the root 132 (i.e. at a radius of ($r_{root}$+X/100*($r_{tip}-r_{root}$))), and a point on the trailing edge that is at the same radial percentage X of a trailing edge radial extent t along the trailing edge 138 from the root 132 at the trailing edge 138. The circumferential direction of the extrusion may be taken at the leading edge position of the plane P. In other words, reference to a cross-section through the blade 130 at a given percentage along the blade span (or a given percentage span position) may mean a section through the aerofoil in a plane defined by: a line that passes through the point on the leading edge that is at that percentage of the span s along the leading edge from the leading edge root and points in the direction of the tangent to the circumferential direction at that point on the leading edge; and a point on the trailing edge that is at that same percentage along the trailing edge 138 from the trailing edge root.

Figure 4:
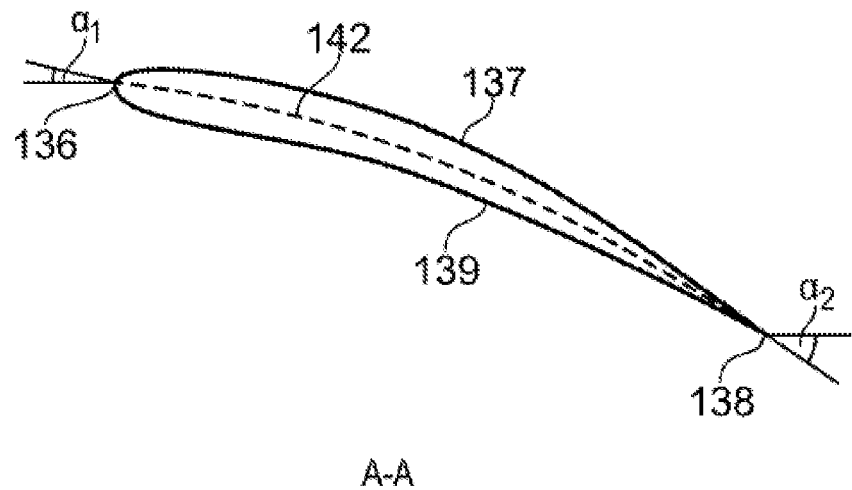
FIG. 4 is a schematic of chord of the fan blade for use with examples of the present disclosure at its root in the radially inner 10% of blade span.
Figure 5:
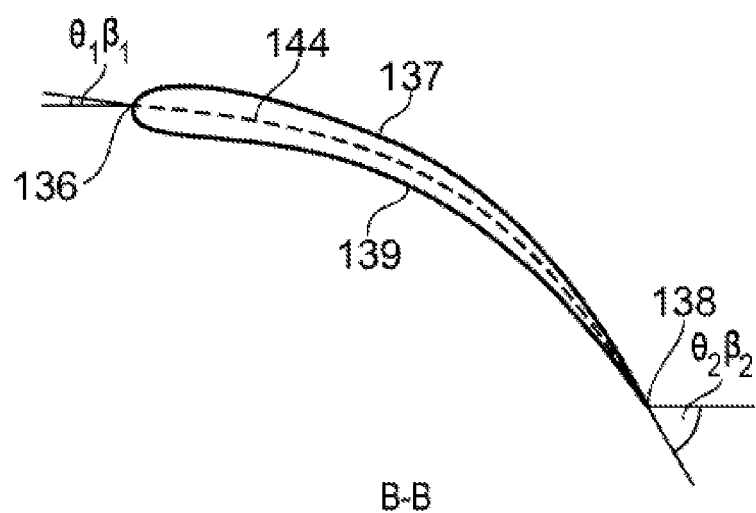
FIG. 5 is a schematic of chord of the fan blade for use with examples of the present disclosure between the 30% span position and the 40% span position.

An example of such a cross-section A-A taken through the blade 130 in such a plane $P_A$ is shown in FIG. 4. The plane $P_A$ is as defined above, with the percentage X of the span s from the root 132 being no greater than 10% (the 10% span position being indicated by the line S10 in FIG. 3). The cross-section A-A has a camber line 142. In general, a camber line 142, 144 (see FIGS. 4 and 5, described below) may be defined as the line formed by the points in a given cross-section that are equidistant from a pressure surface 139 and the suction surface 137 for that cross-section. The camber of the blade 130 at a given cross-section (which may be referred to as the camber of the blade at a given span position) may be defined as the change in angle of the camber line 142 between the leading edge 136 and the trailing edge 138, that is to say ($\alpha_2-\alpha_1$) in the FIG. 4 example.

FIG. 5 shows, again purely by way of example, a possible cross-section B-B taken through the blade 130 in a plane $P_B$. As indicated in FIG. 3, the $P_B$ is as defined above, with the percentage X of the span s from the root 132 being no less than 30% (the 30% span position being indicated by the line S30 in FIG. 3) and no greater than 40% (the 40% span position being indicated by the line S40 in FIG. 3). The camber line 144 of the blade 130 in this cross-section is indicated by the dashed line 144 in FIG. 5. The camber of the blade 130 at the cross-section B-B may be defined as the change in angle of the camber line 144 between the leading edge 136 and the trailing edge 138, that is to say ($\beta_2-\beta_1$).

The average (which, as used herein, may be taken as the mean) camber taken over all cross-sections A-A within the radially innermost 10% of the blade span (that is, between the root 132 and the 10% span line S10) may be indicated as $(\alpha_2-\alpha_1)_{ave}$. The average camber taken over all cross-sections B-B between the 30% span position S30 and the 40% span position S40 may be indicated as $(\beta_2-\beta_1)_{ave}$. The camber may, of course, be averaged over any 10% portion of the blade span, for example between 13% and 23%, 51% and 61%, 76% and 86% or any other 10% span range. There will be one 10% span portion for which the average camber is higher than any other 10% span portion. This may be referred to as the 10% blade span portion that has the maximum average camber $(\theta_2-\theta_1)_{max}$.

In some arrangements, the average camber $(\beta_2-\beta_1)_{ave}$ of each fan blade 130 taken over a portion of the blade between the 30% span position and the 40% span position is as described and/or claimed herein, for example at least 1.2 times the average camber of the radially innermost 10% of the blade span $(\alpha_2-\alpha_1)_{ave}$.

In some arrangements, the average camber $(\alpha_2-\alpha_1)_{ave}$ of each fan blade taken over the radially innermost 10% of the blade span is as described and/or claimed herein, for example no greater than 75% of the average camber of the 10% blade span portion that has the maximum average camber $(\theta_2-\theta_1)_{max}$.

In use, the gas turbine engine 10 may operate at the cruise conditions defined elsewhere herein. Such cruise conditions may be determined by the cruise conditions (for example the mid-cruise conditions) of an aircraft to which at least one (for example 2 or 4) gas turbine engine 10 may be mounted in order to provide propulsive thrust. Parameters such as pressure ratios referred to herein may be taken at such a cruise condition.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
   an engine core comprising a turbine, a compressor, and a core shaft connecting the turbine to the compressor;
   a fan located upstream of the engine core, the fan comprising a hub and a plurality of fan blades, each fan blade having a radial blade span extending from a root at a 0% span position to a tip at a 100% span position, and the plurality of fan blades being fixed pitch fan blades that are unable to rotate relative to the hub;
   a gearbox that receives an input from the core shaft and outputs drive to the fan so as to drive the fan at a lower rotational speed than the core shaft; and
   an annular splitter at which flow is divided between a core flow (A) that flows through the engine core, and a bypass flow (B) that flows along a bypass duct,
   wherein:
   the average camber $(\alpha_2-\alpha_1)_{ave}$ of each fan blade taken over the radially innermost 10% of the blade span is no greater than 75% of the average camber of the 10% blade span portion that has the maximum average camber $(\theta_2-\theta_1)_{max}$;
   a fan root to tip pressure ratio of the gas turbine engine, defined as the ratio of the mean total pressure of flow at a fan exit that subsequently flows through the engine core ($P_{102}$) to the mean total pressure of flow at the fan exit that subsequently flows through the bypass duct ($P_{104}$), is in the range of from 0.83 to 0.9 at cruise conditions; and
   a fan tip loading is defined as $dH/U_{tip}^2$, where dH is the enthalpy rise across the fan and $U_{tip}$ is the velocity of the fan at the tip of each fan blade, and the fan tip loading at the cruise conditions is greater than 0.3 $JKg^{-1}/(ms^{-1})^2$.

2. A gas turbine engine according to claim 1, wherein the average camber $(\alpha_2-\alpha_1)_{ave}$ of each fan blade taken over the radially innermost 10% of the blade span is no greater than 70% of the average camber of the 10% blade span portion that has the maximum average camber $(\theta_2-\theta_1)_{max}$.

3. A gas turbine engine according to claim 1, wherein the average camber $(\alpha_2-\alpha_1)_{ave}$ of each fan blade taken over the radially innermost 10% of the blade span is no greater than 65% of the average camber of the 10% blade span portion that has the maximum average camber $(\theta_2-\theta_1)_{max}$.

4. A gas turbine, engine according to claim 1, wherein the fan tip loading at the cruise conditions is in the range of from 0.3 to 0.4 $JKg^{-1}/(ms^{-1})^2$.

5. A gas turbine engine according to claim 1, wherein a bypass ratio is defined as the ratio of the mass flow rate of the bypass flow (B) that flows along the bypass duct to the mass flow rate of the core flow (A) at the cruise conditions, and the bypass ratio is greater than 10.

6. A gas turbine engine according to claim 1, wherein the specific thrust at the cruise conditions is less than 100 $NKg^{-1}s$.

7. A gas turbine engine according to claim 1, wherein:
   the ratio of the radius of each fan blade at the root ($r_{root}$) to the radius of each fan blade at the tip ($r_{tip}$) is less than 0.33.

8. A gas turbine engine according to claim 1, wherein: the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

9. A gas turbine engine according to claim 1, wherein the fan diameter is greater than 250 cm.

10. A gas turbine engine according to claim 1, wherein a fan root pressure ratio, defined as the ratio of the mean total pressure of flow at the fan exit that subsequently flows through the engine core ($P_{102}$) to the mean total pressure of flow at a fan inlet ($P_{100}$), is no greater than 1.25 at the cruise conditions.

11. A gas turbine engine according to claim 10, wherein: a combustor (17) is provided downstream of the fan and the compressor and upstream of the turbine; an overall pressure ratio is defined as the ratio of the mean total pressure of flow at an inlet to the combustor ($P_{106}$) to the mean total pressure of flow at the fan inlet ($P_{100}$) at the cruise conditions; and the ratio of the fan root pressure ratio to the overall pressure ratio is less than 0.04.

12. A gas turbine engine according to claim 11, wherein the forward speed of the gas turbine engine at the cruise conditions is in the range of from Mn 0.75 to Mn 0.85, and the cruise conditions correspond to atmospheric conditions at an altitude that is in the range of from 10500 m to 11600 m.

13. A gas turbine engine according to claim 10, wherein the forward speed of the gas turbine engine at the cruise conditions is in the range of from Mn 0.75 to Mn 0.85.

14. A gas turbine, engine according to claim 10, wherein the cruise conditions correspond to atmospheric conditions at an altitude, that is in the range of from 10500 m to 11600 m.

15. A gas turbine engine according to claim 1, wherein the fan is a blisk such that the plurality of fan blades are formed integrally with the hub.

16. A gas turbine engine for an aircraft comprising:
   an engine core comprising a turbine, a compressor, and a core shaft connecting the turbine to the compressor;
   a fan located upstream of the engine core, the fan comprising a hub and a plurality of fan blades, each fan blade having a radial blade span extending from a root at a 0% span position to a tip at a 100% span position, the plurality of fan blades being fixed pitch fan blades that are unable to rotate relative to the hub;
   a gearbox that receives an input from the core shaft and outputs drive to the fan so as to drive the fan at a lower rotational speed than the core shaft; and an annular splitter at which flow is divided between a core flow (A) that flows through the engine core, and a bypass flow (B) that flows along a bypass duct, wherein:

the average camber $(\beta_2-\beta_1)_{ave}$ of each fan blade taken over a portion of the blade between the 30% span position and the 40% span position is at least 1.2 times the average camber of the radially innermost 10% of the blade span $(\alpha_2-\alpha_1)_{ave}$; and a fan root to tip pressure ratio, defined as the ratio of the mean total pressure of flow at a fan exit that subsequently flows through the engine core ($P_{102}$) to the mean total pressure of flow at the fan exit that subsequently flows through the bypass duct ($P_{104}$), is in the range of from 0.83 to 0.9 at cruise conditions; and a fan tip loading is defined as $dH/U_{tip}^2$, where dH is the enthalpy rise across the fan and $U_{tip}$ is the velocity of the fan at the tip of each fan blade, and the fan tip loading at the cruise conditions is greater than 0.3 $JKg^{-1}/(ms^{-1})^2$.

17. A gas turbine engine accord ng to claim 16, wherein the average camber $(\beta_2-\beta_1)_{ave}$ of each fan blade taken over a portion of the fan blade between the 30% span position and the 40% span position is at least 1.3 times the average camber of the radially innermost 10% of the blade span $(\alpha_2-\alpha_1)_{ave}$.

18. A gas turbine engine according to claim 16, wherein the average camber $(\beta_2-\beta_1)_{ave}$ of each tan blade taken over a portion of the fan blade between the 30% span position and the 40% span position is at least 1.4 times the average camber of the radially innermost 10% of the blade span $(\alpha_2-\alpha_1)_{ave}$.

* * * * *